(12) United States Patent
Walsh et al.

(10) Patent No.: US 8,893,963 B2
(45) Date of Patent: *Nov. 25, 2014

(54) ISSUING A VALUE-BEARING CARD ASSOCIATED WITH ONLY NON-PERSONALLY IDENTIFYING INFORMATION

(75) Inventors: Timothy James Walsh, Edina, MN (US); Donald Bradly Olah, Medina, MN (US)

(73) Assignee: Ready Credit Corporation, Eden Prairie, MN (US)

(*) Notice: Subject to any disclaimer, the term of this patent is extended or adjusted under 35 U.S.C. 154(b) by 308 days.

This patent is subject to a terminal disclaimer.

(21) Appl. No.: 12/835,487

(22) Filed: Jul. 13, 2010

(65) Prior Publication Data

US 2010/0276486 A1 Nov. 4, 2010

Related U.S. Application Data

(63) Continuation of application No. 11/645,468, filed on Dec. 26, 2006, now Pat. No. 7,766,225.

(60) Provisional application No. 60/755,617, filed on Dec. 30, 2005, provisional application No. 60/815,006, filed on Jun. 20, 2006.

(51) Int. Cl.
*G06K 5/00* (2006.01)
*G07F 19/00* (2006.01)
(Continued)

(52) U.S. Cl.
CPC .......... *G07F 7/1008* (2013.01); *G07F 19/202* (2013.01); *G07F 17/26* (2013.01); *G06Q 20/341* (2013.01); *G06Q 20/18* (2013.01); *G06Q 20/28* (2013.01); *G06Q 20/355* (2013.01); *G07F 7/025* (2013.01); *G06Q 20/342* (2013.01); *G06Q 20/26* (2013.01); *G07F 17/0014* (2013.01)
USPC .......................................... 235/380; 235/375

(58) Field of Classification Search
USPC .......... 235/380, 375, 382, 383, 492, 486, 487
See application file for complete search history.

(56) References Cited

U.S. PATENT DOCUMENTS 5,243,174 A * 9/1993 Veeneman et al. ............ 235/381
5,500,513 A 3/1996 Langhans et al.
(Continued)

FOREIGN PATENT DOCUMENTS

GB 2 338 814 A 12/1999
WO WO 00/11568 3/2000
(Continued)

OTHER PUBLICATIONS

Mar. 13, 2007, Metrorail farecard vending machines, Washington Metropolitan Area Transit Authority, Metrorail farecard and SmarTrip vending machines, www.wmata.com/metrorail/buyingfarecrd.cfm.

(Continued)

*Primary Examiner* — Thien M Le
(74) *Attorney, Agent, or Firm* — Merchant & Gould P.C.

(57) ABSTRACT

Issuing a debit card associated with only non-personally identifying information includes communicating among an input device, a network coupling, and a card dispenser. The input device is configured to receive a new account request. The new account request includes only non-personally identifiable information. The network coupling is configured to send the new account request to an acquirer processor and to receive an approval response from the acquirer processor. The card dispenser is configured to dispense a debit card to the user based on the approval response received from the acquirer processor. The debit card includes only non-personally identifiable information. The non-personally identifiable information includes the account number.

23 Claims, 11 Drawing Sheets

(51) Int. Cl.
*G07F 17/26* (2006.01)
*G06Q 20/34* (2012.01)
*G06Q 20/18* (2012.01)
*G07F 7/10* (2006.01)
*G06Q 20/28* (2012.01)
*G07F 7/02* (2006.01)
*G06Q 20/26* (2012.01)
*G07F 17/00* (2006.01)

(56) References Cited

U.S. PATENT DOCUMENTS

| | | | |
|---|---|---|---|
| 5,500,514 A * | 3/1996 | Veeneman et al. | 235/381 |
| 5,513,117 A | 4/1996 | Small | |
| 5,637,845 A | 6/1997 | Kolls | |
| 5,673,309 A | 9/1997 | Woynoski et al. | |
| 5,696,908 A | 12/1997 | Muehlberger et al. | |
| 5,770,844 A * | 6/1998 | Henn | 235/380 |
| 5,895,456 A | 4/1999 | Beale et al. | |
| 5,940,811 A | 8/1999 | Norris | |
| 5,984,180 A | 11/1999 | Albrecht | |
| 6,105,007 A | 8/2000 | Norris | |
| 6,105,009 A | 8/2000 | Cuervo | |
| 6,405,182 B1 | 6/2002 | Cuervo | |
| 6,578,761 B1 | 6/2003 | Spector | |
| 6,592,044 B1 * | 7/2003 | Wong et al. | 235/493 |
| 6,609,654 B1 * | 8/2003 | Anderson et al. | 235/379 |
| 6,736,251 B2 | 5/2004 | Molbak | |
| 6,755,341 B1 * | 6/2004 | Wong et al. | 235/380 |
| 6,805,288 B2 * | 10/2004 | Routhenstein et al. | 235/380 |
| 7,096,198 B1 | 8/2006 | Cuervo | |
| 7,165,049 B2 | 1/2007 | Slater | |
| 7,252,226 B2 | 8/2007 | Risafi et al. | |
| 8,005,756 B2 | 8/2011 | Phillips et al. | |
| 8,396,747 B2 * | 3/2013 | Bachenheimer | 705/18 |
| 2002/0013747 A1 | 1/2002 | Valentine et al. | |
| 2002/0174016 A1 | 11/2002 | Cuervo | |
| 2003/0001005 A1 | 1/2003 | Risafi et al. | |
| 2003/0088470 A1 | 5/2003 | Cuervo | |
| 2003/0168510 A1 | 9/2003 | Allen | |
| 2003/0191714 A1 | 10/2003 | Norris | |
| 2003/0209597 A1 * | 11/2003 | Veeneman | 235/375 |
| 2004/0007618 A1 | 1/2004 | Oram et al. | |
| 2004/0031847 A1 | 2/2004 | Sorenson et al. | |
| 2004/0147309 A1 | 7/2004 | Chamberlain et al. | |
| 2004/0181463 A1 | 9/2004 | Goldthwaite et al. | |
| 2005/0038737 A1 | 2/2005 | Norris | |
| 2005/0082364 A1 | 4/2005 | Alvarez et al. | |
| 2006/0078100 A1 | 4/2006 | Risafi et al. | |
| 2007/0075134 A1 | 4/2007 | Perlow et al. | |
| 2007/0299756 A1 | 12/2007 | Clearly et al. | |
| 2008/0126123 A1 * | 5/2008 | Duckert | 705/2 |
| 2010/0196753 A1 * | 8/2010 | Heo et al. | 429/158 |

FOREIGN PATENT DOCUMENTS

| | | |
|---|---|---|
| WO | WO 02/099561 A2 | 12/2002 |
| WO | WO 03/071387 A2 | 8/2003 |
| WO | WO 03/083792 A2 | 10/2003 |

OTHER PUBLICATIONS

Mar. 12, 2007, TheCapitol.Net, How to Use the Subway (Metrorail or "The Metro") in Washington, DC, www.thecapitol.net/VisitingDC/metrorail.htm.

* cited by examiner

ISSUING A VALUE-BEARING CARD ASSOCIATED WITH ONLY NON-PERSONALLY IDENTIFYING INFORMATION

This application is a Continuation of U.S. Ser. No. 11/645,468 filed 26 Dec. 2006, now U.S. Pat. No. 7,766,225, which claims benefit of U.S. Ser. No. 60/755,617, filed 30 Dec. 2005, and U.S. Ser. No. 60/815,006, filed 20 Jun. 2006 and which applications are incorporated herein by reference. To the extent appropriate, a claim of priority is made to each of the above disclosed applications.

TECHNICAL FIELD

The invention relates to a system and method for initializing a stored value account and, in particular, a system and method for issuing a value-bearing card associated with only non-personally identifying information.

BACKGROUND OF THE INVENTION

Stored value accounts (i.e., or debit accounts) enable users to conduct transactions using a card similar to a credit account. Debit cards, therefore, enable users to conduct transactions without the need for carrying cash or checks. Debit cards typically use a personal identification number (i.e., a PIN) and, consequently, are safer than cash to carry. Debit cards also enable users to conduct transactions in which cash cannot be used, such as purchasing products and services over the phone or Internet. However, unlike a credit card account, a stored value account only enables a user to complete a transaction if the user has already deposited a sufficient amount of value into the debit account.

In prior systems, to initialize a stored value account and obtain a debit card, a user physically visited a bank branch. The user would meet with an available bank representative. Then, the user would present personal information that enabled the bank representative to verify the identification of the user. The bank optionally conducted further research on the user, for example, checking the user's credit report. The personally identifying information (i.e., information identifying a specific user) would be associated with the stored value account in the records of the bank. In most cases, the personally identifiable information would be indicated on the card or stored in a readable format on the card. Such prior systems can be inconvenient and personally intrusive.

In other prior systems, while users were able to obtain debit cards at locations other than banks, they were still required to complete an application and to provide personal information to obtain the card. Accordingly, the same drawbacks existed in these other prior systems.

Such practices are one reason that a significant portion of the population is underserved or distrusting of the banking system. This "under-banked" portion of the population is generally excluded from traditional banking products such as checking accounts, credit cards, and debit cards. For example, the under-banked population includes individuals having poor credit history, individuals requiring immediate credit, and individuals having no established credit history. Further examples of the under-banked populace include individuals of limited means and/or who distrust banking institutions. Yet another example of the under-banked populace includes individuals wanting to maintain a consistent credit report in preparation for a major purchase. Another subset of under-banked individuals includes "unbanked" individuals. An unbanked person is a person who does not have a banking relationship with a traditional financial institution, such as a commercial bank or savings loan.

In some prior systems, some banking transactions, such as debit card issuance, can be performed using a kiosk remote from a bank. However, in such systems, the kiosk receives personal data from a user and verifies the identity of the user. In other such systems, the kiosk associates personally identifying information with the debit card.

In view of the foregoing, there is a need in the art for convenient, non-intrusive systems and methods of issuing debit cards. Such a system and method would preferably provide for the issuance of debit cards without requiring that the recipient provide any personally identifying information. The present invention overcomes the shortcomings of the prior art and addresses these needs in the art.

SUMMARY OF THE INVENTION

The invention relates to a method and system for converting forms of value bearing instruments into a convenient form of instrument (or other form or object) with which preferably only non-personally identifying information is associated.

In the preferred embodiment, the conversion is performed electronically at a kiosk. The kiosk may include the following components (a) a bill acceptor; (b) a network coupler; (c) a card dispenser; (d) a display screen; (e) an input device; and (f) a receipt printer.

According to one aspect of the invention, there is provided a system for obtaining a debit card. The system may include an asset acceptor, a network coupling, and a card dispenser. The asset acceptor is configured to receive assets, such as currency, checks, and credit cards, from a user. The network coupling is configured to enable communication with an external computer or computer network. In some embodiments, the network coupling is configured to communicate with a central server. The central server is configured to obtain authorization for initializing a debit account from a card processor. In other embodiments, the network coupling is configured to communicate directly with a card processor. The card dispenser is configured to dispense a debit card to the user. The system and the issued debit card stores only non-personally identifying information (e.g., such as the account number).

According to another aspect of the invention, there is provided a method for initializing a debit account, the method comprising: obtaining a new account request and a balance from a terminal, the new account request including only non-personally identifiable information; sending the new account request and the balance from the terminal to an acquirer processor; sending the new account request and the balance from the acquirer processor to a card processor; determining whether to authorize creation of a new account based on only the non-personally identifiable information; sending an authorization response from the card processor to the acquirer processor; and sending the authorization response from the acquirer processor to the terminal.

While the invention will be described with respect to preferred embodiment configurations and with respect to particular devices used therein, it will be understood that the invention is not to be construed as limited in any manner by either such configuration or components described herein. Also, while a particular embodiment kiosk is described herein, it will be understood that such particular kiosk is not to be construed in a limiting manner. Instead, the principles of this invention extend to any environment in which a value bearing-card associated with only non-personally identifying information is issued. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be made to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral.

DETAILED DESCRIPTION OF THE PREFERRED EMBODIMENT

The invention relates to methods and systems for exchanging forms of value bearing instruments for a convenient value bearing form associated with only non-personally identifying information. In particular, the invention relates to methods and systems for transferring monetary value to a prepaid card without requiring submission of personal information.

Figure 1:
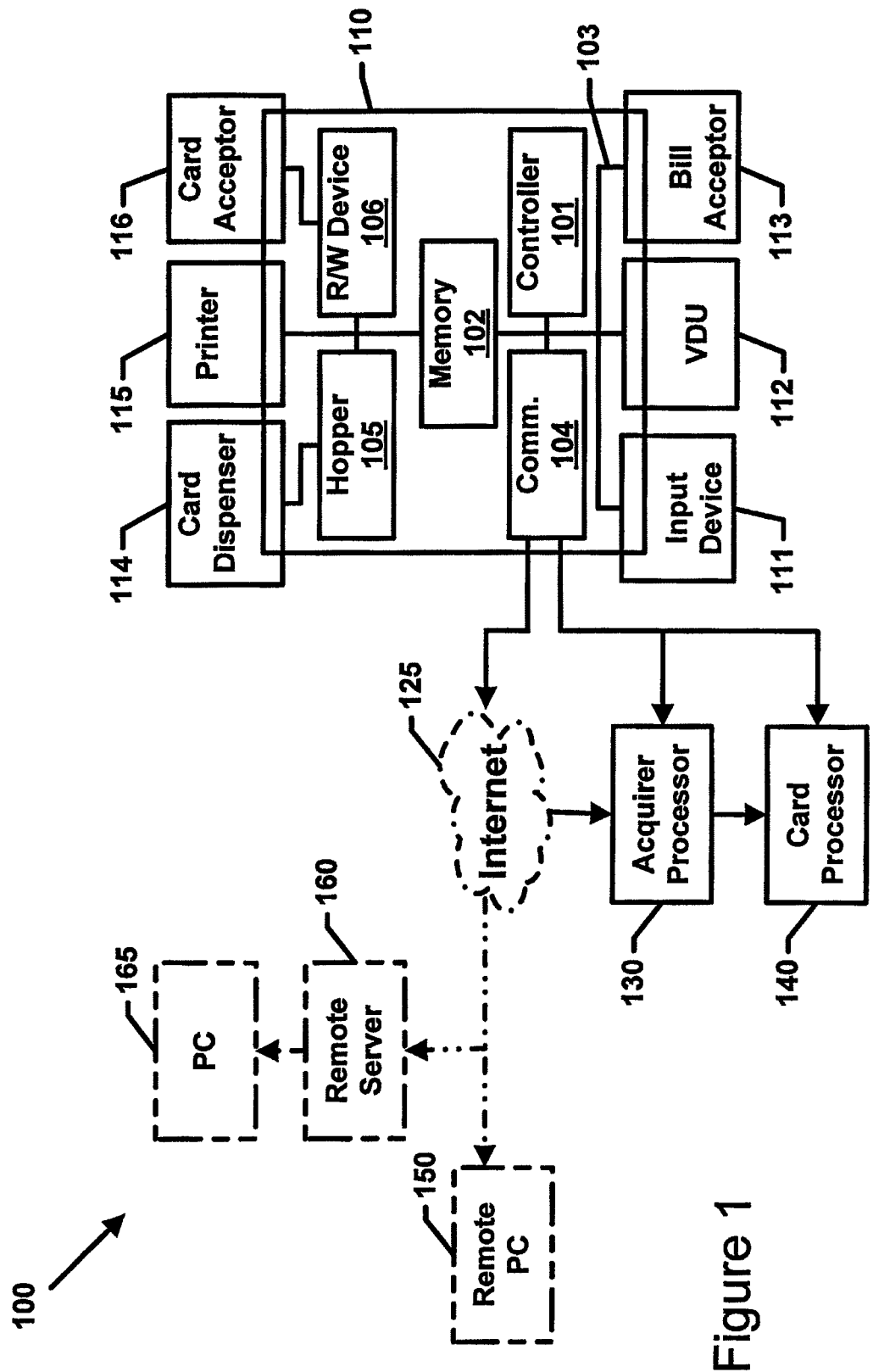
FIG. 1 illustrates a system for implementing the teachings of the present disclosure.

FIG. 1 illustrates a block diagram of an example hardware and operating environment for implementing the teachings of the present disclosure. The description of FIG. 1 provides an overview of computer hardware (e.g., a kiosk) and a suitable computing environment in conjunction with which some embodiments of the present invention can be implemented. The system is shown generally at 100.

Some embodiments of the present invention are described in terms of a computer executing computer-executable instructions. However, some embodiments of the present invention can be implemented entirely in computer hardware in which the computer-executable instructions are implemented in read-only memory. Some other embodiments of the invention can also be implemented in client/server computing environments where remote devices that are linked through a communications network perform tasks. Program modules can be located in local and/or remote memory storage devices in a distributed computing environment.

In general, kiosk 110 includes a controller 101 operatively coupled to multiple internal components by a system bus 103. Embodiments of the present invention are not limited to any specific type of kiosk 110, however. In some embodiments, the controller 101 is configured to execute kiosk software. In other embodiments, the controller 101 is configured to operate other system components. For example, the controller 101 can include a computer processor commercially available from Intel®, Motorola®, Cyrix® and other such companies.

In some embodiments, an operating system, kiosk software, and other desired data can be stored on a system memory 102. Some examples of system memory 102 include random-access memory (RAM), read-only memory (ROM), and one or more mass storage devices. In other embodiments, however, an embedded system can be used to increase security and minimize service calls. For example, the operating system, software, and/or data can be embedded onto a solid state chip. In one such embodiment, the operating system can be programmed onto a solid state chip and transactional data and logs/files can be accumulated onto a Flash memory or a similar solid state device.

Furthermore, kiosk 110 can be communicatively connected to the Internet 125, a private network, or a virtual private network via a communication device 104. One example of a private network can be established by routing network cables only between parties to the network. Virtual networks enable parties to emulate a private network over a public telecommunications infrastructure. For example, software or firmware can create an encrypted "tunnel" enabling data traffic to pass between the parties, but not to a third party.

Network connectivity is well known within the art. The communication device 104 of kiosk 110, which can be internal or external, is connected to the system bus 103. In one example embodiment, the communication device 104 is a modem that responds to communication drivers to connect to the Internet via what is known in the art as a "dial-up connection." In another example embodiment, the communication device 104 is an Ethernet or similar hardware (network) card connected to a local-area network (LAN) that itself is connected to the Internet via what is known in the art as a "direct connection" (e.g., T1 line, etc.). In yet another example embodiment, the communication device 104 includes a wireless modem and hub to connect to the Internet via what is known in the art as a "wireless connection." Embodiments of the present disclosure are not limited to any particular type of network connection device 104.

In other embodiment, the communication device 104 can include a firewall. Generally, a firewall manages who and what has access to the systems being protected by the firewall. Typically, firewalls are used to protect private network, especially those used in conjunction with public telecommunications networks. As known in the art, firewalls can be implemented through either hardware or software.

In some embodiments, the kiosk 110 can operate in a networked environment using logical connections to one or more remote computers, such as an acquirer processor 130 (discussed further below with reference to FIG. 2), a card processor 140 (discussed further below with reference to FIG. 2), or another remote computer. In some embodiments, example remote computers include another computer 150, a server 160, and a network PC 165. In one embodiment, the remote computer is configured to download configuration and/or diagnostic software to the kiosk 110. In another embodiment, the remote computer includes a database for storing parameters used by the kiosk 110 in conducting various transactions. In other example embodiments, however, the remote computer can also include a router, a client, a peer device, a mobile device such as a cell phone or PDA, and any other suitable network node.

In some embodiments, the kiosk 110 further includes a hopper 105. The hopper 105 contains one or more pre-printed debit cards configured for distribution. Each debit card in the hopper 105 corresponds with an uninitialized account with a card processor (shown in FIG. 2). In other example embodiments, the kiosk 110 includes a read device 106. The read device 106 is configured to read a debit card inserted into the device, for example, through a card acceptor 116 discussed below. In some embodiments, the read device 106 is a read/write device configured also to write to the inserted debit card. In particular, the read/write device 106 is configured to encode information, such as an account number, on the inserted card. In one embodiment, the device 106 encodes the information onto a magnetic strip. In another embodiment, the device 106 encodes the information onto an integrated circuit chip. In still another embodiment, a contactless card or smart card may be used. Such cards may include radio frequency technology. In these cases, the radio frequency device may include the information (such as an account number) in advance, or the device 106 may encode such information.

In general, the kiosk 110 is operatively coupled to an input device 111, a display device 112, a bill acceptor 113, a card dispenser 114, a printing device 115, and a card acceptor 116. Kiosk 110 can be operated using at least one operating environment to provide a graphic user interface including the display screen 112 and input device 111. Such operating environments include operating systems such as versions of the Microsoft Windows® and Apple MacOS® operating systems well known in the art. Embodiments of the present invention are not limited to any particular operating environment, however, and the construction and use of such operating environments are well known within the art.

A user enters commands and information into the kiosk 110 through the input device 111. Input device 111 permits interaction with the graphic user interface (GUI) of the kiosk 110 to navigate through menus and select options provided by the GUI. Examples of input device 111 include touch screens, mice, touch pads, trackballs, remote controls, point sticks, and keyboards. However, embodiments of the present invention are not limited to any particular input device 111. The input device 111 is operatively coupled to the system bus 103.

Display device 112 permits the display of information, including computer, video, textual, and other information, for viewing by a user of the kiosk 110. Such display devices include cathode ray tube (CRT) displays (monitors), as well as flat panel displays such as liquid crystal displays (LCD's). Embodiments of the present invention, however, are not limited to any particular display device 112. Display device 112 is operatively coupled to the system bus 103. In some examples, the display device 112 also acts as the input device 111. For example, in one embodiment, the display device 112 is a touch screen. In addition to an input device 111 and a display screen 112, other example embodiments of a kiosk 110 may include other peripheral input/output devices such as speakers.

Bill acceptor 113 is configured to receive and determine the value of one or more value bearing instruments or monetary forms inserted by the user. For example, in some embodiments, bill acceptor 113 is configured to accept paper currency. In one embodiment, bill acceptor 113 is configured to accept U.S. dollar bills in particular increments, such as $10, $20, $50, and $100 increments. In other embodiments, bill acceptor 113 is configured to accept other value bearing forms such as personal checks, traveler's checks, credit cards, debit cards, coins, and tokens. Bill acceptor 113 can be configured to accept a variety of value-bearing forms and/or include a plurality of different bill acceptors 113 in order to accommodate the different types of value-bearing forms desired to be accepted. The bill acceptor 113 is operatively coupled to the system bus 103.

Card dispenser 114 is configured to dispense a debit card to the user. In some example embodiments, the cards are pre-loaded into the hopper 105 and the hopper is operatively coupled to the card dispenser 114. In this embodiment, the card dispenser 114 dispenses the next card in the hopper 105. The card dispenser 114 is operatively coupled to the system bus 103.

The printing device 115 is configured to print a receipt for the user. In some example embodiments, the printing device 115 is configured to print a receipt including a current balance. In other embodiments, the printing device 115 is configured to print a receipt including the number of allowed reloads the user has remaining. The concept of reloading a card is discussed in more detail below. The printing device 115 is operatively coupled to the system bus 103.

The card acceptor 116 is configured to read information stored on a dispensed card. In some example embodiments, the card acceptor 116 is configured to hold the card throughout a transaction. In other example embodiments, the card acceptor 116 is configured to read a card as the card is swiped past a sensor (e.g., a magnetic stripe and/or a radio frequency device may be read). The card acceptor 116 is operatively coupled to the system bus 103. In one example embodiment, the card acceptor 116 is further configured to encode information on the debit card. For example, in one embodiment, a current account balance is stored on a card. In other embodiments, however, the card acceptor 116 encodes any desired information except information personal to the user on the card.

Figure 2:
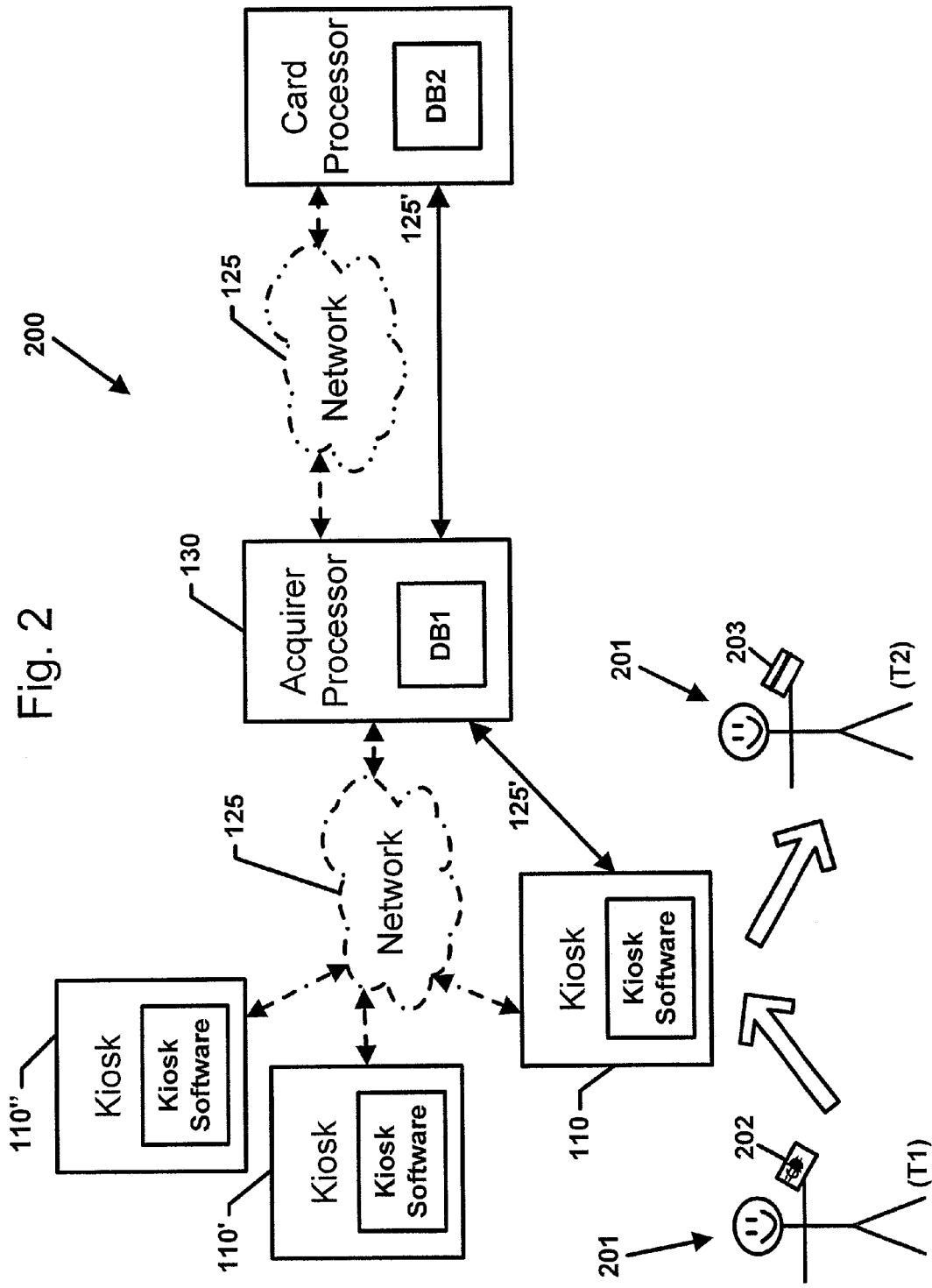
FIG. 2 illustrates a network for implementing the teachings of the present disclosure.

Referring now to FIG. 2, a user 201 can conduct an obtain transaction using the kiosk 110. The obtain transaction includes obtaining from the kiosk 110 a debit card 203 associated with a user account and initializing the user account with a card processor 140. The obtain transaction is discussed in more detail further below with respect to FIG. 3. FIG. 2 illustrates a network 200 for implementing the obtain transaction. The network 200 includes a plurality of kiosks 110, 110', 110", an acquirer processor 130, and a card processor 140. A user 201 inputs currency or other value-bearing instruments 202 into the kiosk 110 at a first time T1 and is issued a debit card 203 at a second time T2 after utilizing the kiosk 110.

In some embodiments, an account number is pre-encoded onto the card 203. In other embodiments, other account information is encoded onto the card 203 prior to being dispensed from the kiosk 110. In some embodiments, an expiration date can be encoded onto the card 203. In one embodiment, the expiration date is one year from the date of issuance. However, information personal to the user is not encoded on the card 203 and is not required in order to receive the value bearing instruments 202 or to initialize and dispense the card 203. In some embodiments, the card 203 is branded to reflect the card processor 140 associated with the account number stored on the card 203. For example, the card 203 may be branded as a VISA®, MASTERCARD®, AMERICAN EXPRESS®, or as some other brand and/or generic card.

The kiosk 110 includes a device, such as bill acceptor 113 of FIG. 1, configured to accept value-bearing instruments 202 and a device, such as card dispenser 114 of FIG. 1, to dispense a debit card 203. In other example embodiments, the kiosk 110 is configured to enable a user 201 to check a balance on a previously acquired card 203. In some embodiments, the kiosk 110 is configured to print receipts indicating the balance placed on the card 203. In still other embodiments, the kiosk 110 is configured to add value to the card 203.

In some example embodiments, each kiosk 110, 110', 110" is configured to electronically communicate with the acquirer processor 130, which then communicates with the card processor 140 to initialize a user account with the card processor 140. For example, in one embodiment, a network connection 125 provides electronic communication between the kiosk 110, the acquirer processor 130, and the card processor 140. In other example embodiments, the kiosk 110, the acquirer processor 130, and card processor 140 are electronically communicatively coupled to one another via a direct line 125'. In other embodiments, the kiosks 110, 110', 110" are configured to communicate directly with the card processor 140.

In general, the acquirer processor 130 includes a server system coupled to each kiosk 110, 110', 110". In some embodiments, the acquirer processor 130 maintains configuration files storing standard parameters for each kiosk 110, 110', 110". In other example embodiments, each kiosk 110, 110', 110" maintains a local configuration file (not shown) storing standard parameters.

In some embodiments, a configuration file includes a maximum balance a user may deposit to a card when first obtaining the card. In one embodiment, the maximum balance is $100. In other embodiments, a configuration file includes a minimum balance that a user may deposit to a card when first obtaining the card. In one embodiment, the minimum balance is $20. In still other embodiments, a configuration file specifies that a card balance cannot be reloaded or cannot be reloaded more than a particular number of times and that the reload value cannot exceed a certain value. For example, one configuration file may specify that a card cannot be reloaded more than three times and that no more than $500 can be added per reload. Further examples of configuration parameters include transaction fees and permitted bill denominations.

In some embodiments, the acquirer processor 130 includes a database DB1 of account information for each account associated with a debit card 203 loaded in a kiosk. For example, in one embodiment, the database DB1 stores the number of times the balance on the card 203 has been reloaded (i.e., the number of times value has been added to the card 203 after being dispensed to the user).

The card processor 140 is the entity that issues and manages the user accounts. The card processor 140 also determines whether to authorize purchase transactions between the user 201 and various merchants. In some example embodiments, the card processor 140 is a bank. In other example embodiments, the card processor 140 is a non-bank, financial service company. In some embodiments, the card processor charges a periodic maintenance fee or other fees to the account. For example, in one embodiment, the card processor deducts $4.95 per month in maintenance fees from the card account.

The card processor 140 includes a database DB2 of card accounts. In general, the database DB2 stores the status of each account, a current balance of each account, and tracking data for each account. For example, in some embodiments, the account status information includes one of "Awaiting Initialization," "Enabled," "Disabled," and "Lost or Stolen." In one example embodiment, the database DB2 also stores information regarding the number of times the card 203 has been reloaded.

Figure 3:
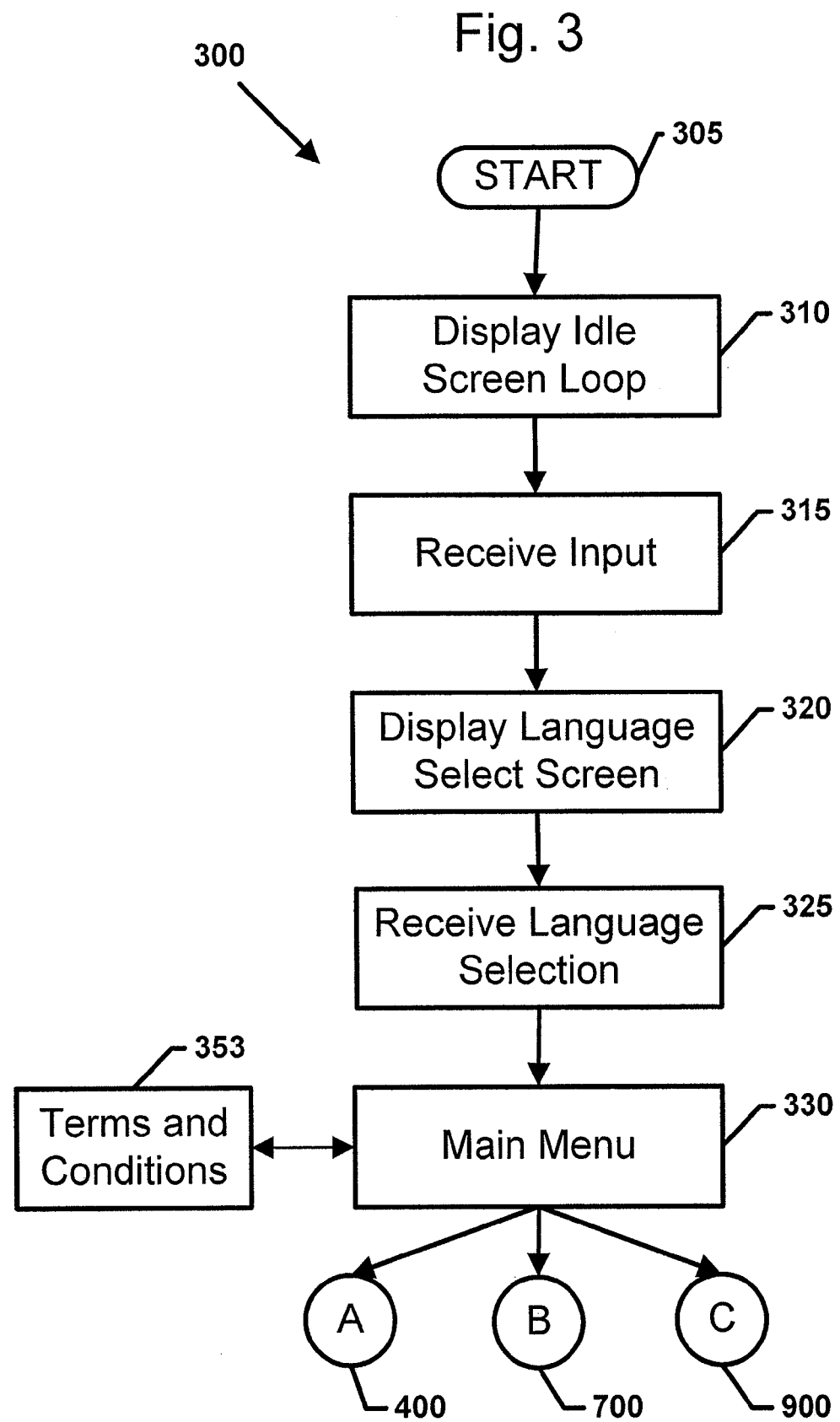
FIG. 3 illustrates an operation flow for logging into a debit card kiosk according to one embodiment of the present disclosure.

Referring now to FIG. 3, FIG. 3 illustrates an example operation flow for a process 300 for logging into a kiosk, such as kiosk 110 of FIG. 1. Process 300 begins at module 305 and proceeds to idle operation 310. Idle operation 310 displays an idle screen loop on a display device, such as display device 114 of FIG. 1, of the kiosk. In some example embodiments, the idle screen loop is a series of eye-catching advertisements to encourage use of the kiosk. In other example embodiments, the idle screen loop is a series of instructions explaining how to begin a kiosk transaction.

Input operation 315 receives input from a user indicating that a user wishes to conduct a kiosk transaction. In some example embodiments, the received input includes information received from a keyboard or other input device, such as input device 111 of FIG. 1. In other example embodiments, the received input includes pressure sensor information from a combination input and display device, such as a touch screen, indicating that a user has touched the combination device.

In some embodiments, process 300 includes a language selection operation 320. Language selection operation 320 displays a choice of languages to the user and selection operation 325 receives user input indicating a desired language in which to conduct the kiosk transaction.

Menu operation 330 displays a main menu to the user on the display device, such as display device 112 of FIG. 1, of the kiosk. In general, the main menu indicates the types of kiosk transactions that a user can conduct at the kiosk. For example, in some embodiments, the kiosk transactions include an obtain operation 400 to initialize an account on a new card, a balance reload operation 700 to add value to an existing card, and a balance check operation 900 to determine a current balance on an existing card. In other embodiments, cards cannot be reloaded at the kiosk. In one embodiment, the display menu operation 330 also enables a user to view legal information. For example, in one embodiment, the main menu enables a user to view the terms and conditions for one or more kiosk transactions.

Menu operation 330 receives a user's selection of a kiosk transaction. Process 300 next proceeds to one of an obtain operation 400 at module A, a reload operation 700 at module B, or a balance check operation 900 at module C based on the user's selection. The obtain operation 400 is discussed herein with reference to FIG. 4. The reload operation 700 is discussed herein with reference to FIG. 7. The balance check operation 900 is discussed herein with reference to FIG. 9.

Figure 4:
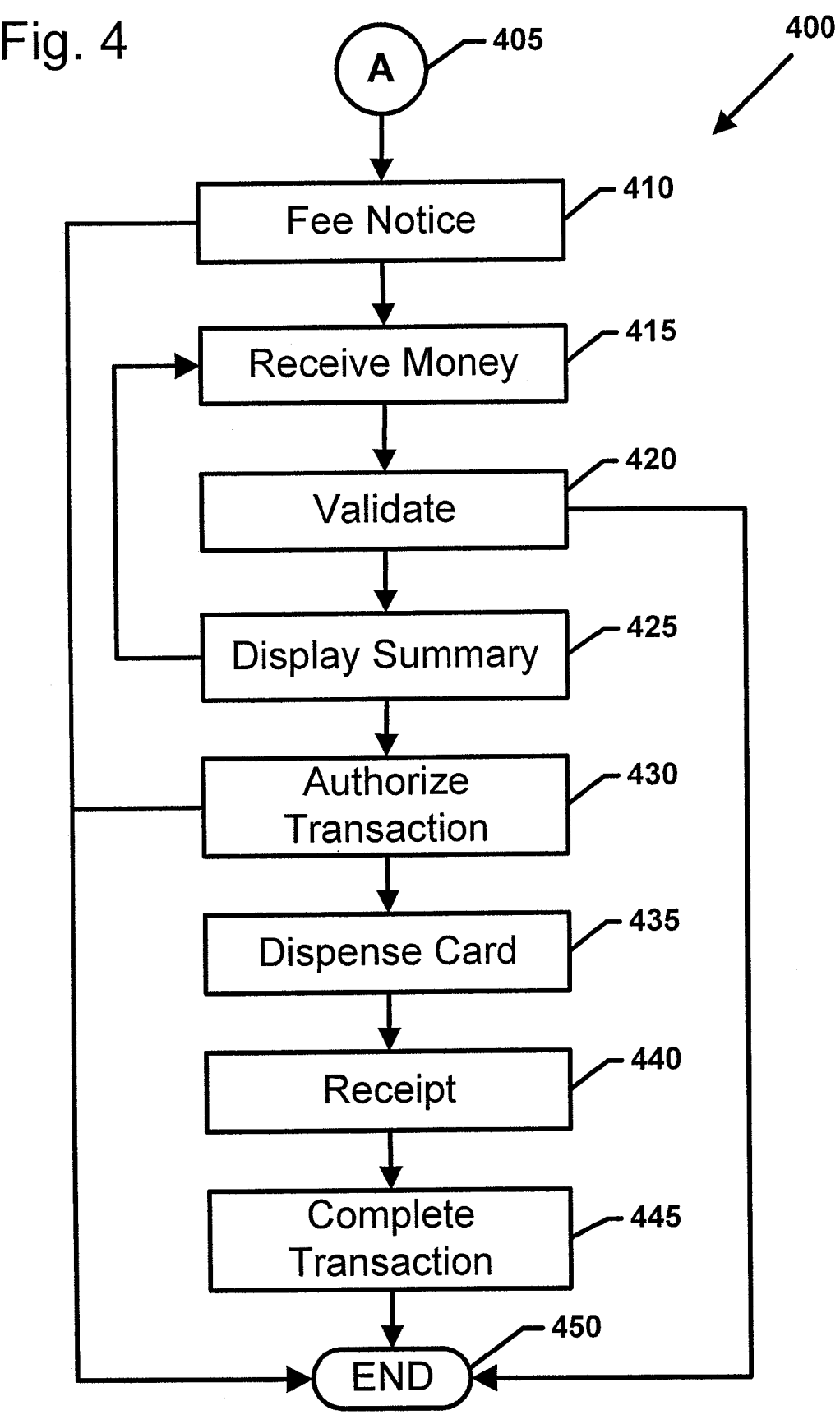
FIG. 4 illustrates an operation flow for obtaining a debit card according to one embodiment of the present disclosure.

Referring now to FIG. 4, FIG. 4 illustrates an operation flow for implementing the obtain transaction 400. The obtain transaction 400 begins at module 405 and proceeds to fee operation 410. Fee operation 410 displays to the user the fee charged for obtaining a new debit card, such as card 203 of FIG. 2. Fee operation 410 also receives user input indicating whether the user wishes to proceed with transaction 400 in spite of the fee.

Receive money operation 415 receives currency or other value-bearing instruments, such as value-bearing instruments 202 of FIG. 2, from the user via a currency acceptor, such as bill acceptor 111 of FIG. 1. In some embodiments, the currency acceptor is configured to accept paper money in specific monetary increments. In other embodiments, currency acceptor is configured to accept coins.

In some example embodiments, validate operation 420 determines the value of the currency being inserted in the receive money operation 415. In other example embodiments, validate operation 420 determines whether the inserted currency is acceptable in format and constitutes legal tender. If the inserted currency is determined to be valid, then summary operation 425 displays the total value input by the user on the display device of the kiosk. If the inserted currency is determined to be invalid, however, then summary operation 425 displays an error message on the display device and the transaction may end at module 450.

Transaction 400 may then either loop back to the receive money operation 415 or proceed to an authorize transaction operation 430. In some example embodiments, transaction 400 loops back to the receive money operation 415 if the user continues to insert currency into the currency acceptor. However, in other embodiments, the transaction 400 may loop back to the receive money operation 415 if the amount entered is not sufficient for the transaction 400 or if the user otherwise indicates using the kiosk input device a desire to add more currency.

Figure 5:
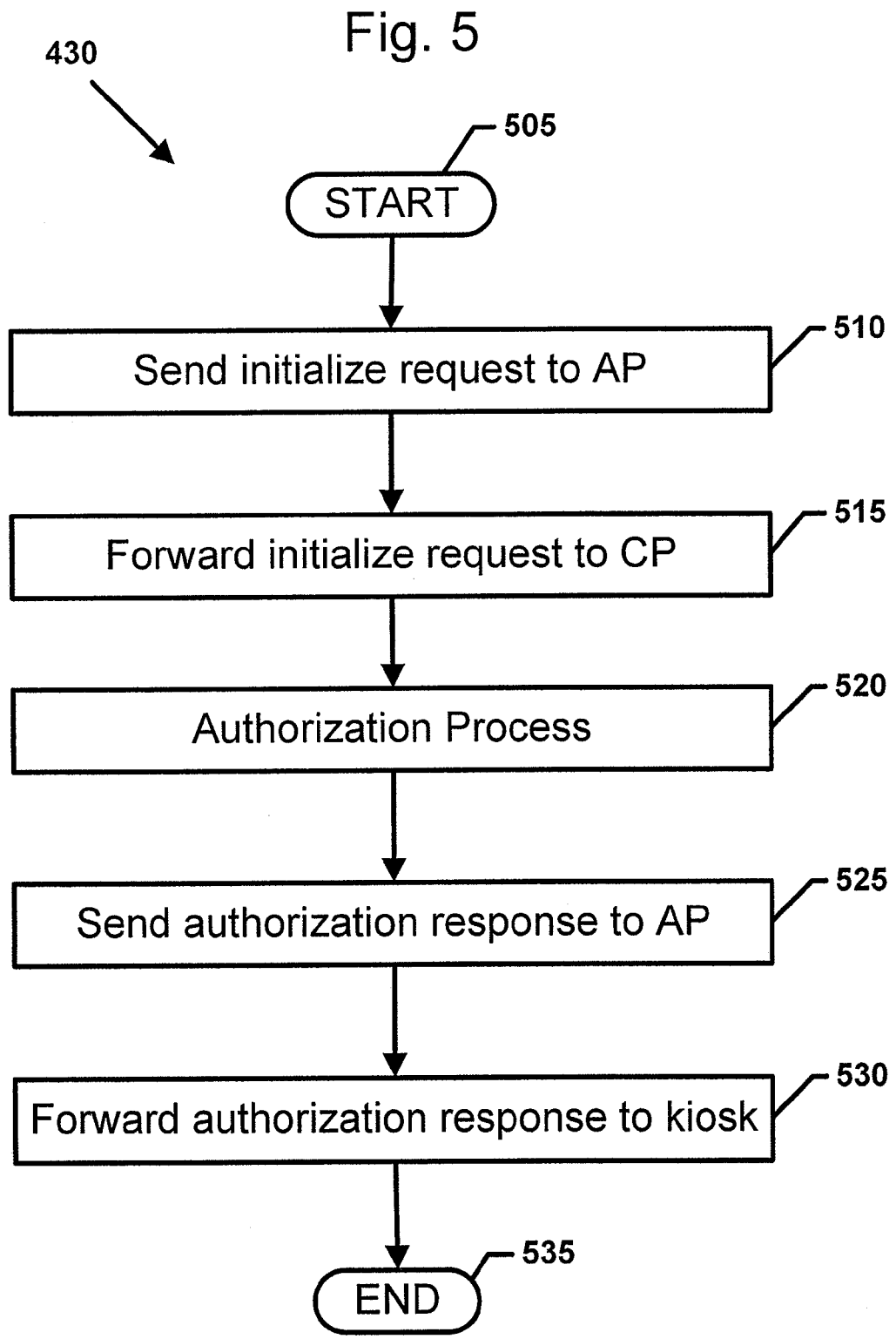
FIG. 5 illustrates an operation flow for an example process implementing an authorize transaction operation of FIG. 4.
Figure 6:
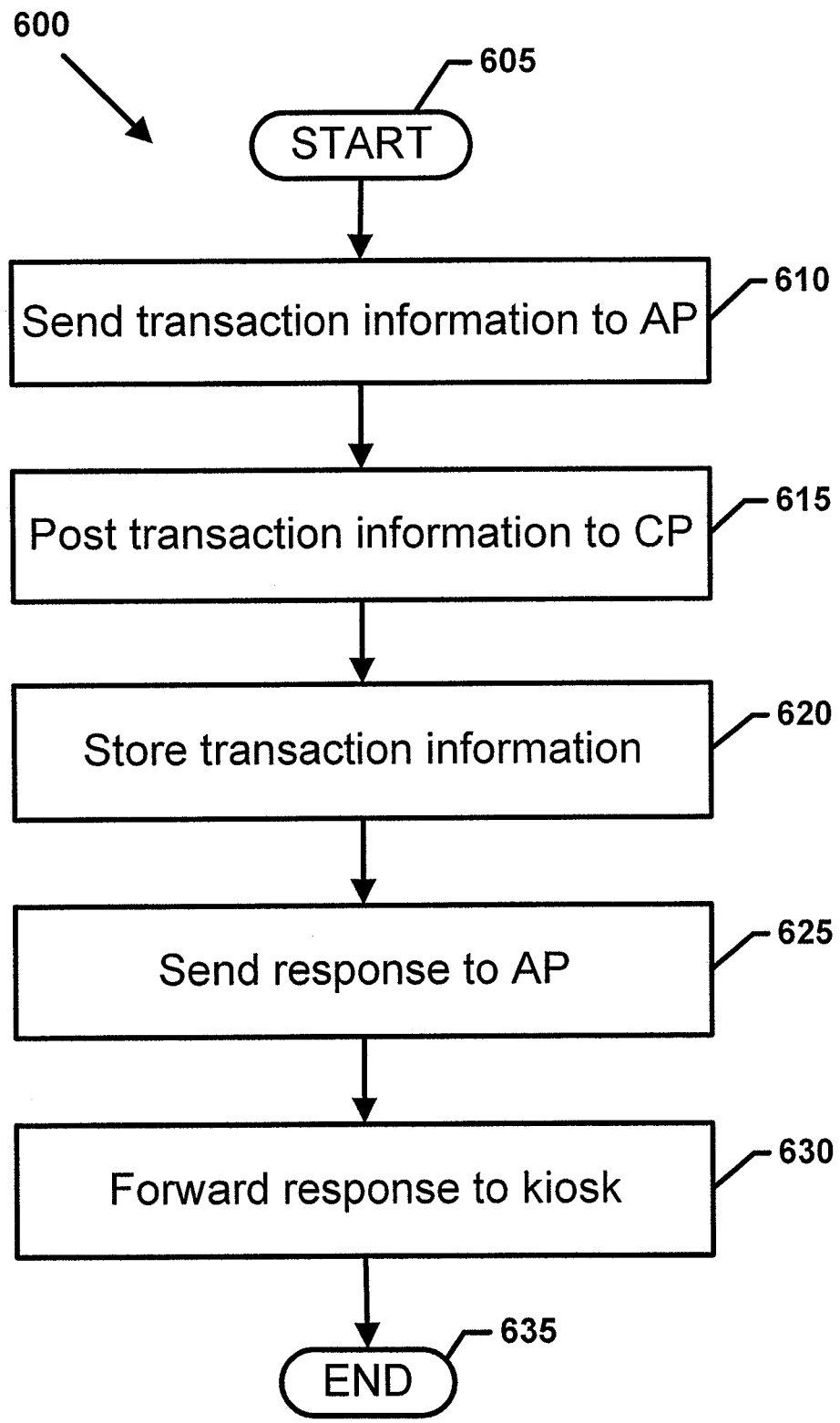
FIG. 6 illustrates an operation flow for a process for implementing a complete transaction operation of FIG. 4.

Authorize transaction operation 430 is discussed in detail herein with reference to FIGS. 5 and 6. If the authorize transaction operation 430 results in an approval message (e.g., a transaction identifier), then the transaction 400 proceeds to dispense operation 440. However, if authorization operation 430 results in a decline message or error message, then transaction 400 ends at module 450.

Dispense operation 435 dispenses the debit card, such as card 203 of FIG. 2, to the user via a card dispenser, such as card dispenser 114 of FIG. 1. In some embodiments, the card is dispensed from a hopper, such as hopper 105 of FIG. 1. An account number is encoded and stored on the dispensed card. In some embodiments, other information such as a PIN number created by the user or the identity of the card processor is encoded on the card before dispensing. However, information personal to the user is not encoded on the dispensed card.

Receipt operation 440 provides a receipt to the user. For example, in one embodiment, receipt operation 440 prints and dispenses a receipt using a printer, such as printer 115 of FIG. 1. In another embodiment, print operation 440 provides a confirmation number associated with the transaction 400. The transaction 400 then proceeds to complete transaction operation 445, which will be described in more detail herein with reference to FIG. 6. The transaction 400 ends at module 450.

FIG. 5 illustrates an operation flow for an example process 500 implementing the authorize transaction operation 430 of FIG. 4. The authorize transaction process 500 begins at module 505 and proceeds to send request operation 510. Send request operation 510 sends a request from a kiosk, such as kiosk 110 of FIG. 1, to an acquirer processor, such as acquirer processor 130 of FIG. 2, to initialize the card account associated with the next card in the hopper. In some embodiments, the request includes the account number associated with the next card in the hopper, the total value inserted by the user, and tracking data. The request can also include information identifying the kiosk. In other embodiments, however, any desired information other than information personal to the user can be included in the request.

Forward request operation 515 transmits the initialization request to a card processor, such as card processor 140 of FIG. 2. The initialization request includes the account number associated with the card arranged to be dispensed by the kiosk. In other embodiments, however, any desired information except information personal to the user, can be forwarded to the card processor.

Authorization operation 520 performs an authorization process in which the card processor approves or denies the initialization request. In some embodiments, the authorization process includes determining the status of the card account associated with the account number included in the request. If the account status is "Awaiting Initialization," then the authorization operation 520 approves the request and changes the account status to "Enabled." If the account status is "Lost or Stolen" or already "Enabled," however, then the authorization operation 520 denies the request.

Next, authorization reply operation 525 sends an authorization response to the acquirer processor. In some embodiments, the authorization response includes authorization to issue a debit card for the requested balance. In other embodiments, the authorization response includes authorization to issue a debit card for an amount different from the requested balance. In still other embodiments, the authorization response includes a denial of the transaction.

Forward reply operation 530 sends an authorization response to the kiosk based on the authorization response from the card processor. In some embodiments, the approval response includes a code signaling the kiosk to complete the transaction. In other embodiments, the approval response includes the authorized balance for encoding onto the card. In still other embodiments, the approval response includes a code signaling the kiosk to deny the transaction. The process 500 ends at module 535.

Referring now to FIG. 6, FIG. 6 illustrates an operation flow for an example process 600 for implementing the complete transaction operation 445 of FIG. 4. In general, the process 600 is implemented after the card, such as card 203 of FIG. 2, has been dispensed from the kiosk, such as kiosk 110 of FIG. 1. The process 600 begins at module 605 and proceeds to send transaction information operation 610. In some embodiment, send transaction information operation 610 includes sending from the kiosk to the acquirer processor the account number, a balance issue amount, and a transaction code indicating the status of the transaction.

For example, in some embodiments, the send transaction information operation 610 sends a transaction code to the acquirer processor to indicate whether or not a user completed the transaction. For example, in one embodiment, the send transaction information operation 610 sends a transaction code indicating that the transaction timed out. In another example embodiment, the send transaction information operation 610 sends a transaction code indicating that the minimum payment was not met. In yet another example embodiment, the send transaction information operation 610 sends a transaction code indicating that the user completed the transaction.

The post transaction operation 615 forwards at least a portion of the transaction information received from the kiosk to the card processor. In some example embodiments, if the transaction code received from the kiosk indicated that the user completed the transaction, then the post transaction operation 615 forwards the account number and a balance issue amount to the card processor. In some other embodiments, if the transaction code received from the kiosk indicated that the user failed to complete the transaction, then the status of the account is changed back to "Awaiting Initialization."

Store transaction operation 620 enters transaction information received from the acquirer processor into a database, such as account database DB2 of FIG. 2. In some embodiments, store transaction operation 620 enters the account number, account balance, and account status into the database. In other embodiments, store transaction operation 620 also enters tracking information regarding the dispensed card into the database.

Send response operation 625 transmits a response from the card processor to the acquirer processor. In some example embodiments, send response operation 625 transmits a transaction identifier to the acquirer processor. In one embodiment, the acquirer processor stores the transaction identifier in a database, such as account database DB1 of FIG. 2. In some other embodiments, send response operation 625 transmits an error message to the acquirer processor. In still other embodiments, send response operation 625 transmits a marketing message to the acquirer processor.

Forward response operation 630 transmits the response from the acquirer processor to the kiosk. In some example embodiments, forward response operation 630 transmits an authorization code to the kiosk. In other example embodiments, forward response operation 630 transmits at least one of the transaction identifier, the error message, and the marketing message to the kiosk.

Figure 7:
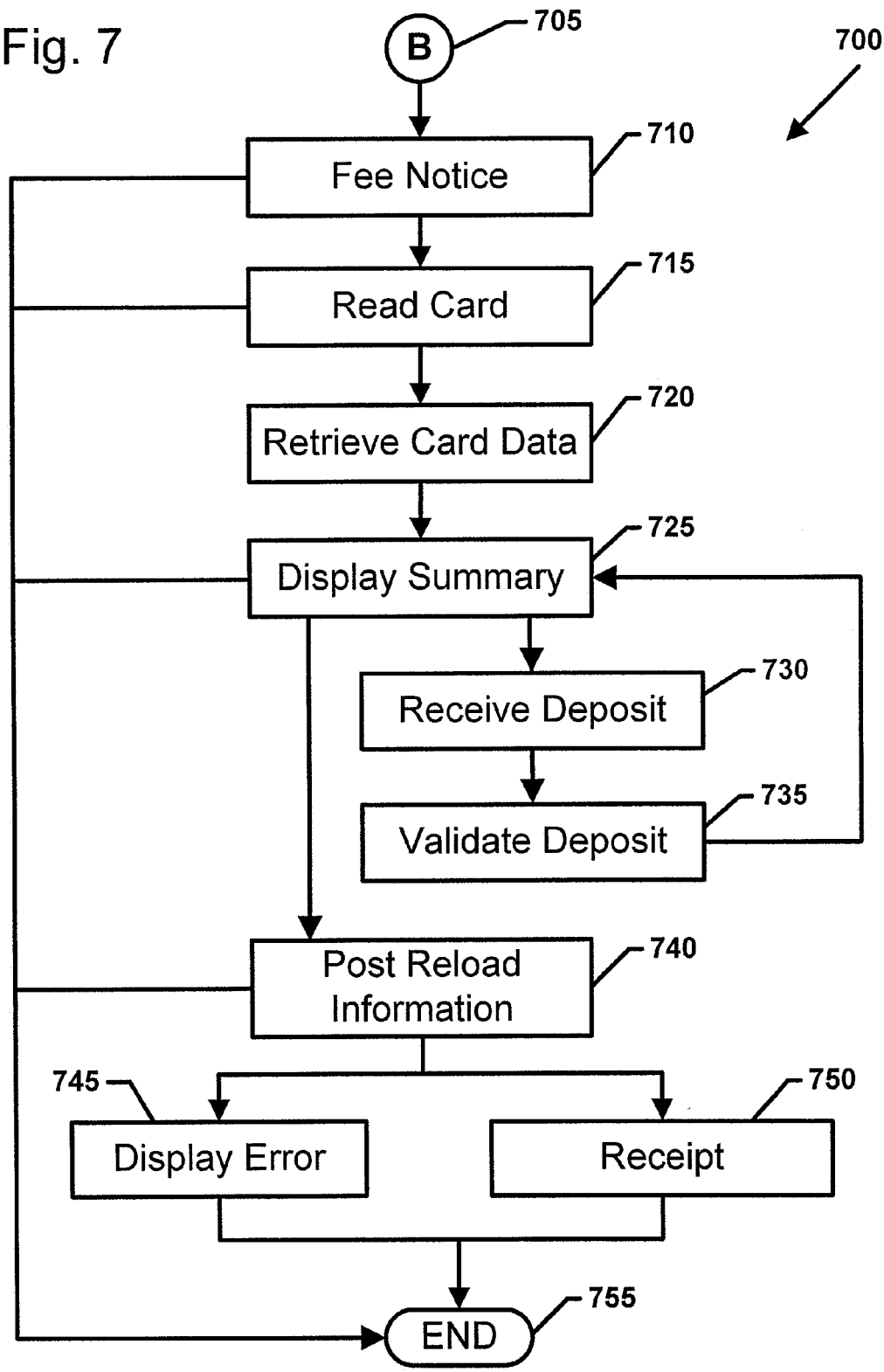
FIG. 7 illustrates an operation flow for the process for reloading a debit card.

FIG. 7 illustrates an operation flow for the process 700 for reloading a debit card, such as card 203 of FIG. 2. Process 700 begins at module 705 and proceeds to fee operation 710. Fee operation 710 displays to the user the fee charged for reloading an existing debit card. Fee operation 710 also receives user input indicating whether the user wishes to proceed with reload transaction 700 in spite of the fee. If the user chooses not to continue, then process 700 ends at module 755. If the user chooses to continue, however, then process 700 proceeds to read operation 715.

Read operation 715 scans a previously dispensed debit card. In one example embodiment, read operation 715 is implemented with a card acceptor that holds the card throughout the transaction. In another example embodiment, read operation 715 is implemented by swiping the debit card through a card scanner. In some embodiments, read operation 715 obtains an account number associated with the card. In other embodiments, read operation 715 obtains the identity of the card processor associated with the account number. In still other embodiments, read operation 715 obtains a reload counter. In yet still other embodiments, read operation 715 obtains an expiration date of the card. However, if read operation 715 is unable to obtain information from the card, then an error message is displayed on the display device of the kiosk and the process 700 ends at module 755.

Retrieve operation 720 contacts an acquirer processor, which contacts the card processor associated with the account number, and requests account information associated with the account number. Retrieve operation 720 receives the account information from the acquirer processor. In some example embodiments, retrieve operation 720 receives an existing account balance. In other example embodiments, retrieve operation 720 receives an account creation date, an account expiration date, and a number of attempted reloads. However, in still other embodiments, retrieve operation 720 may receive any information that does not personally identity the user. Retrieve operation 720 is further described herein with reference to FIG. 8.

Still referring to FIG. 7, in some embodiments, summary operation 725 displays the current account balance to the user using the kiosk display device. In some example embodiments, summary operation 725 determines whether the card has expired and, if so, ends the transaction 700 at module 755. If the account has not expired, then deposit operation 730 accepts currency or other value-bearing instruments from the user. In some example embodiments, the user deposits the currency in a bill acceptor, such as bill acceptor 111 of FIG. 1. In other example embodiments, the user deposits money into a coin slot or enters a checking account and routing number using an input device.

Validate operation 735 determines the value of the inserted currency and whether the inserted currency is legal tender. In some example embodiments, validate operation 735 also determines whether the value of the inserted currency would cause the account balance to exceed the maximum allowed balance. Process 700 then loops back to summary operation 725. In some embodiments, if validate operation 735 determines the inserted currency to be valid, then summary operation 725 displays the total amount of currency inserted by the user. The user may then choose to insert more money or to proceed with the re-load transaction.

In one embodiment, if the user chooses to proceed, then process 700 proceeds to authorization operation 740. In another embodiment, if the user chooses to insert more money, then process 700 proceeds back to deposit operation 730. In other embodiments, if validate operation 735 determines that the deposited currency is invalid, that the card is expired, that the reload counter has reached a maximum limit, or that a maximum allowed balance has been reached, then summary operation 725 displays an error message and the process 700 ends at module 755.

Post reload operation 740 transmits a message to the acquirer processor indicating whether the user completed the transaction. In some example embodiments, post reload operation 740 resembles the complete transaction operation 445 of FIGS. 4 and 6. In general, post reload operation 740 transmits transaction information, such as an account number and a new balance, to the card processor, which store the transaction information in a database. In some example embodiments, post reload operation 740 updates a reload counter. In one of these embodiments, post reload operation 740 updates a reload counter stored on a database of the card processor. In another of these embodiments, post reload operation 740 updates a reload counter stored on a database of the acquirer processor.

In some embodiments, post reload operation 740 further includes transmitting a transaction identifier or error message to the kiosk. In one embodiment, an error message indicates a denial of the transaction and error operation 745 displays an error message to the user. In this case, the process 700 ends at module 755. In another embodiment, however, the transaction identifier indicates approval of the transaction and the process 700 proceeds to receipt operation 750.

In some embodiments, receipt operation 750 prints and dispenses a receipt to the user. For example, in one embodiment, print operation 750 creates a receipt using a printer, such as printer 116 of FIG. 1. In another example embodiment, print operation 750 provides a confirmation number associated with the transaction. The process 700 ends at module 755.

Figure 8:
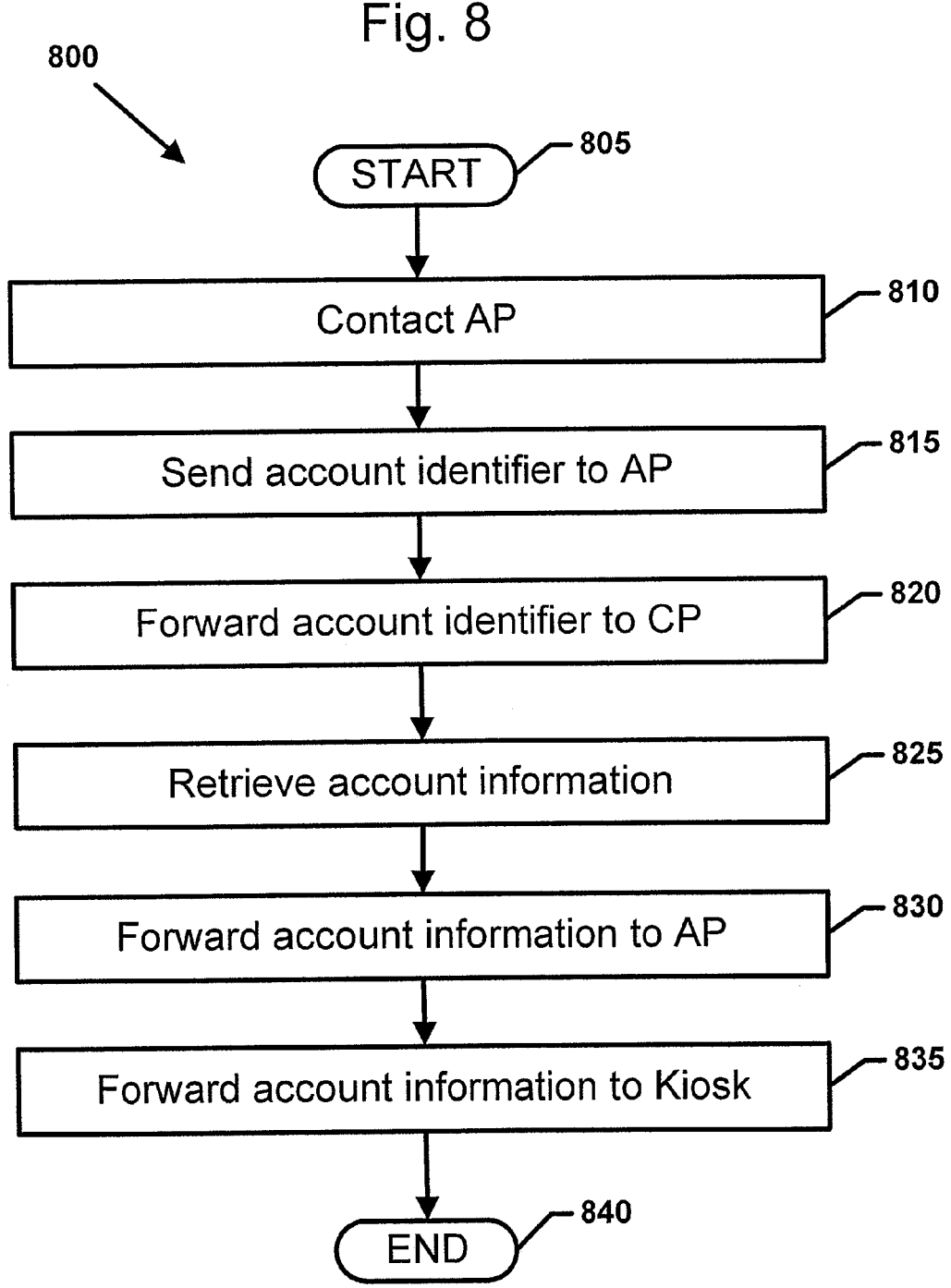
FIG. 8 illustrates a process for implementing a retrieve operation of FIG. 7.

FIG. 8 illustrates a process 800 for implementing retrieve operation 720 of FIG. 7. The process 800 begins at module 805 and proceeds to contact operation 810. Contact operation 810 initiates contact between the kiosk and the acquirer processor. In some embodiments, however, contact is already established and the process proceeds to a send account identifier operation 815.

Send operation 815 transmits information identifying a card account to the acquirer processor. In some example embodiments, information identifying a card account includes an account number, a card processor identifier, and account tracking information. Forward identifier operation 820 transmits at least a portion of the information received by the acquirer processor to the card processor.

Retrieve operation 825 searches relevant databases of the card processor for account information. In some example embodiments, account information includes account status and a current balance. In other example embodiments, account information includes a reload counter, an expiration date, and a maximum account balance. In still other example embodiments, however, account information includes any desired information except information that personally identifies the user.

Send information operation 830 transmits account information from the card processor to the acquirer processor. Forward information operation 835 transmits at least a portion of the received account information from the acquirer processor to the kiosk. The process 800 ends at module 840.

Figure 9:
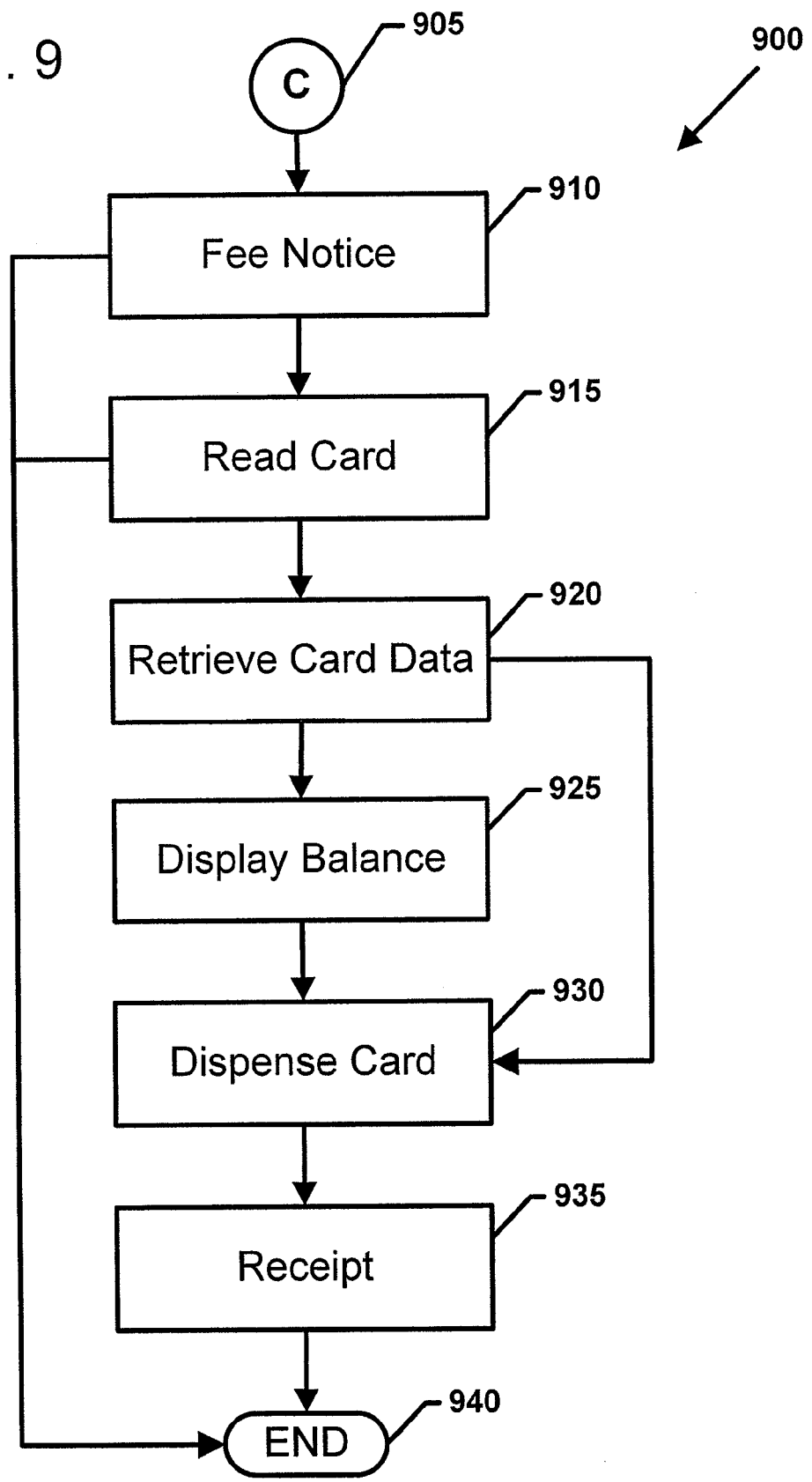
FIG. 9 illustrates an operation flow for a process implementing a balance check on an issued debit card.

Referring now to FIG. 9, a user can also check a balance on an existing card. FIG. 9 illustrates an operation flow for a process 900 implementing a balance check on an issued debit card. In some embodiments, the user is not charged a fee to check an account balance. In such embodiments, the process 900 begins at module 905 and proceeds directly to read operation 915.

In other embodiments, the process 900 begins at module 905 and proceeds to fee operation 910. Fee operation 910 displays to the user the fee charged for checking the balance on an existing debit card. Fee operation 910 also receives user input indicating whether the user wishes to proceed with the check balance transaction 900 in spite of the fee. If the user chooses not to continue, then process 900 ends at module 940. If the user chooses to continue, however, then process 900 proceeds to read operation 915.

Read operation 915 scans a previously dispensed debit card. In one example embodiment, read operation 915 is implemented with a card acceptor that holds the card throughout the transaction. In another example embodiment, read operation 915 is implemented by swiping the debit card through a card reader. In some embodiments, read operation 915 scans the received card and obtains an account number associated with the card. If read operation 915 is unable to obtain information from the card, then an error message is displayed on the display device and process 900 ends at module 940.

Next, retrieve operation 920 contacts the acquirer processor and requests account information. In general, retrieve operation 920 resembles retrieve operation 720 of FIGS. 7 and 8. The request for account information is forwarded to the card processor, which retrieves the account information from its databases. In some example embodiments, some account information is retrieved from databases of the acquirer processor. Retrieve operation 920 sends the retrieved account information from the card processor to the acquirer processor and then to the kiosk.

In some example embodiments, an optional display operation 925 displays the retrieved account balance on the display screen of the kiosk. In other embodiments, the account balance is not displayed on a kiosk display screen. Rather, process 900 proceeds directly to dispense operation 930.

In some example embodiments, a dispense operation 930 returns the debit card to the user. In other example embodiments, the kiosk did not retain the debit card in read operation 910 and the process 900 proceeds directly to print operation 935. Print operation 935 provides a receipt to the user. In some example embodiments, a printing device prints a receipt including the current account balance and dispenses the receipt to the user. In other example embodiments, however, the receipt includes any desired information that is not personal to the user. The process 900 ends at module 940.

Figure 10:
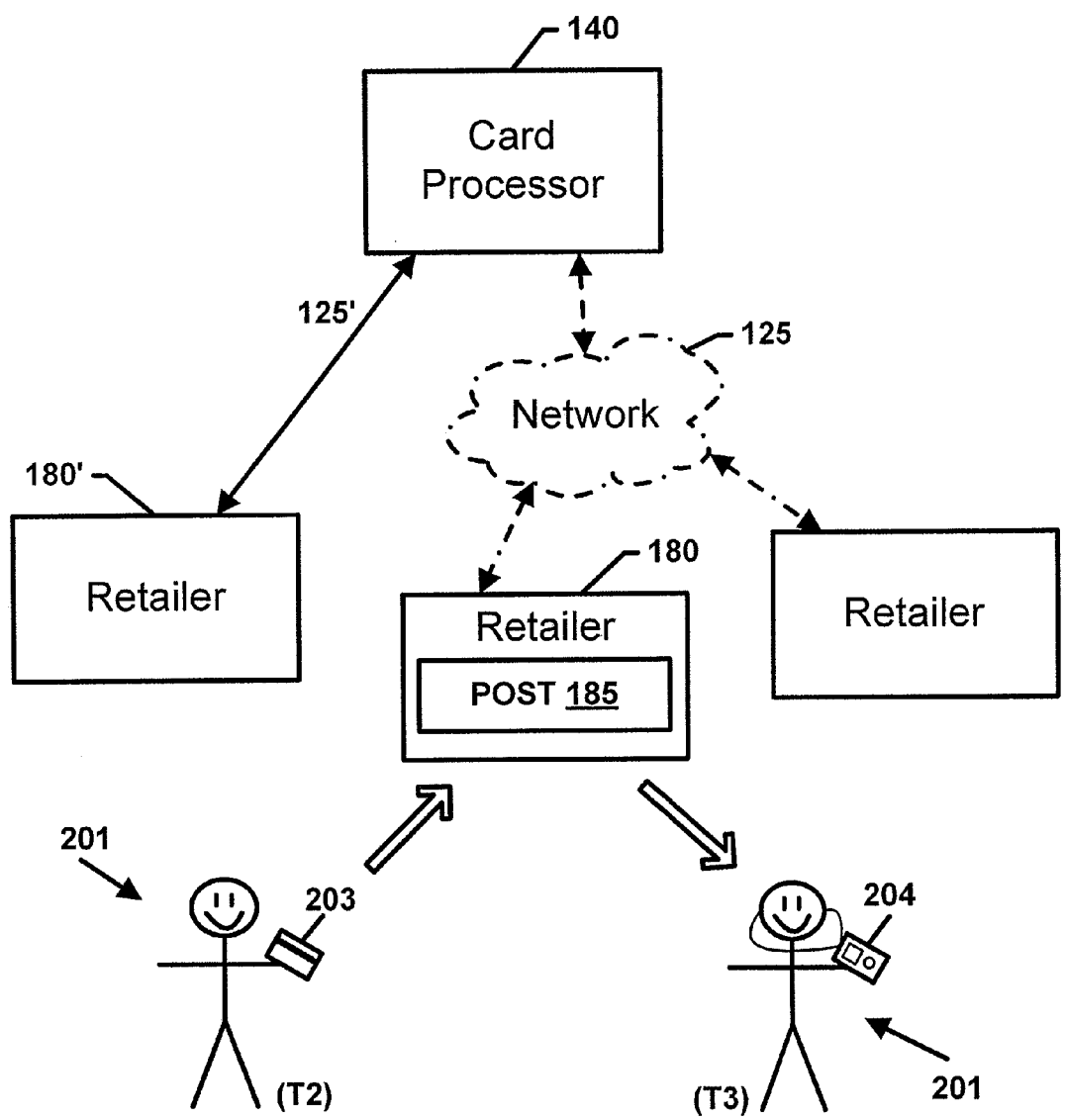
FIG. 10 illustrates a network including a card processor in electronic communication with one or more retailers.
Figure 11:
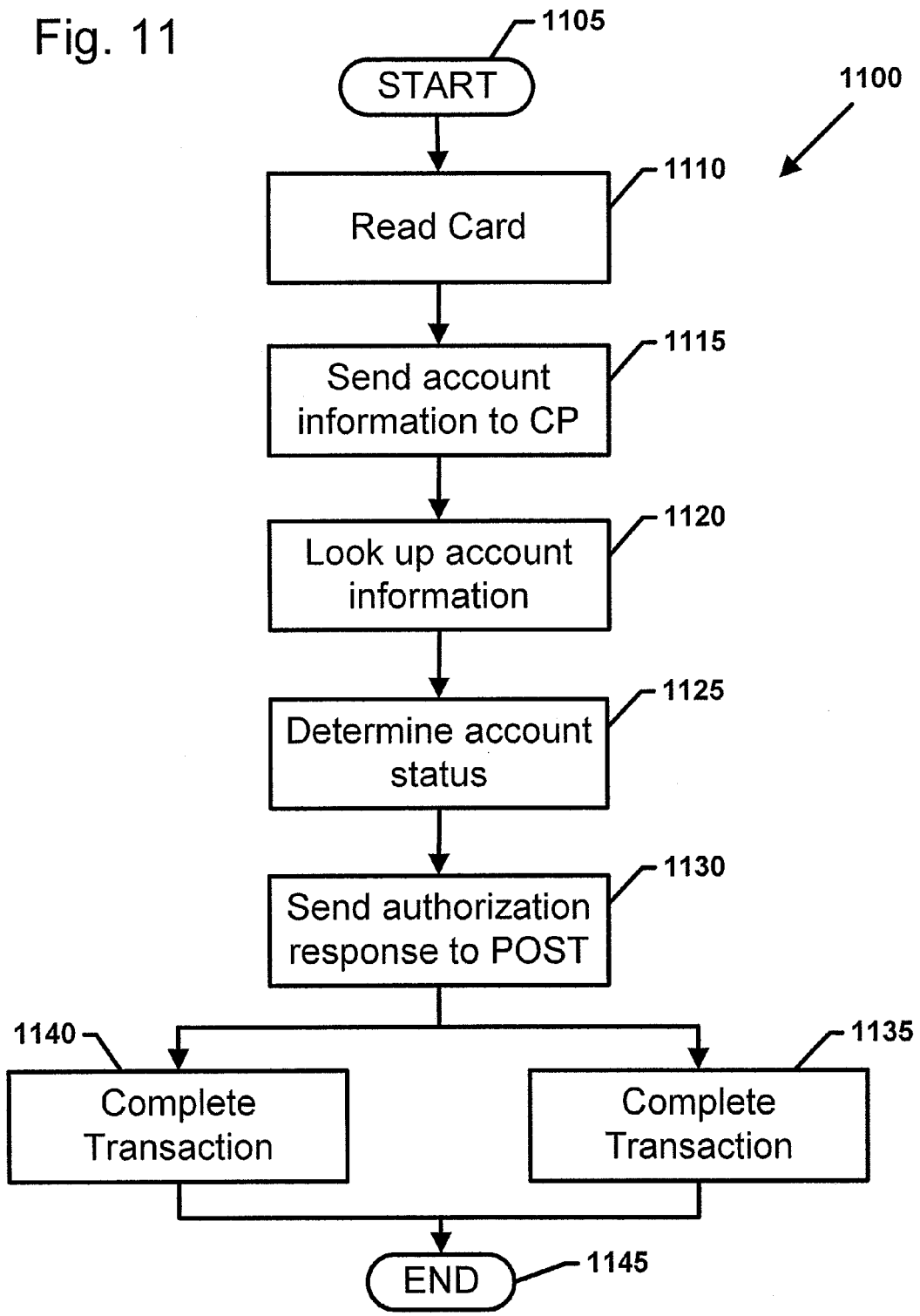
FIG. 11 illustrates an operation flow for authorizing a debit from an existing account according to one embodiment of the present disclosure.

Referring now to FIGS. 10 and 11, the user 201 may purchase one or more products 204 at a third time T3 using the pre-paid card 203 obtained from the kiosk 210 at time T2. The purchase transaction is discussed in more detail herein with respect to FIG. 11. FIG. 10 illustrates a network 1000 including a card processor 140 in electronic communication with one or more retailers 180, 180', 180". Each retailer 180, 180', 180" includes a point of sale (POS) terminal 185.

In some example embodiments, a network connection 125 provides the electronic communication between the card processor 140 and the merchants 180, 180', 180". In other embodiments, one or more of the retailers 180, 180', 180" are electronically coupled to the card processor 140 via a direct line 125'. In still other embodiments, the retailers 180, 180', 180" are communicatively coupled to the card processor 140 through an acquirer processor 130'. In these embodiments, the acquirer processor 130' can be the same as or different from the acquirer processor 130 of FIG. 2. Typically, each retailer 180, 180', 180" has one acquirer processor 130' with whom the retailer 180, 180', 180" has a business relationship.

FIG. 11 illustrates an operation flow for a process 1100 implemented when a user, such as user 201 of FIG. 2, attempts to purchase a product, such as product 204, from a retailer, such as retailer 180. The process 1100 begins at module 1105 and proceeds to read operation 1110. In some embodiments, read operation 1110 scans a card, such as branded debit card 203 of FIG. 2, and obtains account information. In other embodiments, however, read operation 1110 obtains any suitable information except personal information related to the cardholder. In general, a retailer, such as retailer 180, implements read operation 1110 using a POS terminal, such as POS terminal 185 of FIG. 10.

Communicate operation 1115 contacts the card processor associated with the account number on obtained from the debit card. In some embodiments, communication operation 1115 first contacts the acquirer processor having a business relationship with the retailer and the acquirer processor contacts the card processor. In other example embodiments, communication operation 1115 contacts the card processor directly.

In some example embodiments, communicate operation 1115 establishes a communication line to the acquirer processor or card processor using an autodialer. In other example embodiments, the retailer has an open communication line to the acquirer processor or card processor via a dedicated line. However, communicate operation 1115 may establish any suitable connections allowing communication between the retailer and the card processor.

In some embodiments, communicate operation 1115 forwards a request for approval of a purchase transaction to the card processor. In one example embodiment, the request for approval includes an account number and a purchase value. In another example embodiment, the request for approval includes the identity of the retailer. However, the request for approval does not include information personal to the user.

Retrieve operation 1120 retrieves the account information associated with the obtained account number from databases of the card processor. Status operation 1125 evaluates whether to authorize the transaction. Generally, status operation 1125 determines the status and current balance of the account associated with the obtained account number. In some example embodiments, the status operation 1125 also determines whether the existing account balance is sufficient to cover the purchase value of the purchase transaction (i.e., the price of the product being purchased).

If the existing account balance is sufficient, then authorization reply operation 1130 forwards a response to the retailer indicating that the card processor has approved the transaction. If the existing account balance is not sufficient or if the account status is not "Enabled," then the authorization reply operation 1130 forwards a response to the retailer indicating that the card processor has declined to authorize the transaction.

If the card processor approves the purchase transaction, then the process 400 proceeds to transaction completion operation 1135. In some embodiments, the complete transaction operation 1135 sends a message to the card processor indicating that the transaction has been completed. In one example embodiment, the card processor updates the user's account with a new balance reflecting the amount applied to the purchase transaction. In other embodiments, the complete transaction operation 1135 stores the card number in a storage unit of the retailer.

If the card processor denies authorization, however, then reply operation 1130 forwards a response to the retailer indicating that the debit transaction is not approved. The process 1100 then proceeds to error operation 1140. Error operation 1140 displays an error message or warning to the retailer. In some embodiments, the error message indicates a reason that authorization was denied. The process 1100 ends at module 1145.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A system for issuing a value-bearing card, the system comprising:
    an input device, the input device being configured to receive a new account request, the new account request including only information that does not identify a specific user;
    a network coupling operationally coupled to the input device, the network coupling being configured to send the new account request to an approver and to receive an approval response from the approver;
    a card dispenser operationally coupled to the network coupling, the card dispenser being configured to dispense a value-bearing card based on the approval response, the value-bearing card including only information that does not identify the specific user, the information including an account number; and
    a card reader for scanning information stored on the value-bearing card, the scanned information including the account number.

2. The system of claim 1, further comprising:
    an asset acceptor, the asset acceptor being configured to receive assets, the assets including at least one of the group consisting of currency, checks, and credit cards; and
    a controller, the controller being configured to determine a value of the assets;
    wherein the new account request includes the value of the assets.

3. The system of claim 1, further comprising a card encoder, the card encoder being configured to store information on the value-bearing card.

4. The system of claim 1, further comprising a display screen configured to present selectable options to the user.

5. The system of claim 4, wherein the display screen includes a touch screen, which forms at least part of the input device.

6. The system of claim 1, wherein the input device, the network coupling, and the card dispenser are housed at a kiosk.

7. The system of claim 1, wherein the value-bearing card is a debit card.

8. The system of claim 1, wherein the account number is associated with an account at a card processor.

9. The system of claim 8, wherein the value-bearing card is branded to reflect the card processor.

10. The system of claim 8, wherein the value-bearing card includes an expiration date.

11. A method for issuing a value-bearing card, comprising:
    receiving, at a kiosk, a request to obtain a value-bearing card for a value amount;
    sending the request to an approver, the request including the value amount and excluding any information capable of identifying a specific user; and
    issuing the value-bearing card from the kiosk upon receipt of approval from the approver by dispensing the value-bearing card through a slot defined by the kiosk, the value-bearing card being associated with the value amount and including only information that does not identify the specific user.

12. The method of claim 11, wherein the value-bearing card is a debit card.

13. The method of claim 11, further comprising receiving, at the kiosk, a value-bearing instrument with which the specific user pays the value amount.

14. The method of claim 13, wherein receiving the value-bearing instrument comprises receiving a credit card at an asset acceptor at the kiosk.

15. The method of claim 13, wherein receiving the value-bearing instrument comprises receiving cash at an asset acceptor at the kiosk.

16. The method of claim 11, wherein receiving the request to obtain the value-bearing card comprises receiving input from the specific user at a touch screen display at the kiosk.

17. The method of claim 16, wherein receiving the request to obtain the value-bearing card comprises receiving a selection at a graphic user interface displayed on the touch screen display.

18. The method of claim 11, wherein the dispensed value-bearing card includes an encoded account number.

19. A system for issuing a value-bearing card, the system comprising:
    an input device, the input device being configured to receive a new account request, the new account request including only information that does not identify a specific user;
    a network coupling operationally coupled to the input device, the network coupling being configured to send the new account request to an approver and to receive an approval response from the approver;
    a card dispenser operationally coupled to the network coupling, the card dispenser being configured to dispense a value-bearing card based on the approval response, the value-bearing card including only information that does not identify the specific user, the information including an account number; and
    a card encoder, the card encoder being configured to store information on the value-bearing card.

20. A system for issuing a value-bearing card, the system comprising:
    an input device, the input device being configured to receive a new account request, the new account request including only information that does not identify a specific user;
    a network coupling operationally coupled to the input device, the network coupling being configured to send the new account request to an approver and to receive an approval response from the approver;

a card dispenser operationally coupled to the network coupling, the card dispenser being configured to dispense a value-bearing card based on the approval response, the value-bearing card including only information that does not identify the specific user, the information including an account number; and a display screen configured to present selectable options to the user.

21. A system for issuing a value-bearing card, the system comprising:

an input device, the input device being configured to receive a new account request, the new account request including only information that does not identify a specific user;

a network coupling operationally coupled to the input device, the network coupling being configured to send the new account request to an approver and to receive an approval response from the approver;

a card dispenser operationally coupled to the network coupling, the card dispenser being configured to dispense a value-bearing card based on the approval response, the value-bearing card including only information that does not identify the specific user, the information including an account number; and wherein the input device, the network coupling, and the card dispenser are housed at a kiosk.

22. A method for issuing a value-bearing card, comprising:

receiving, at a touch screen display at a kiosk, a request from a specific user to obtain a value-bearing card for a value amount;

sending the request to an approver, the request including the value amount and excluding any information capable of identifying the specific user; and issuing the value-bearing card from the kiosk upon receipt of approval from the approver, the value-bearing card being associated with the value amount and including only information that does not identify the specific user;

wherein receiving the request to obtain the value-bearing card comprises receiving input from the specific user at a touch screen display at the kiosk.

23. A method for issuing a value-bearing card, comprising:

receiving, at a kiosk, a request to obtain a value-bearing card for a value amount;

sending the request to an approver, the request including the value amount and excluding any information capable of identifying a specific user;

receiving, at an asset acceptor at the kiosk, cash with which the specific user pays the value amount; and issuing the value-bearing card from the kiosk upon receipt of approval from the approver, the value-bearing card being associated with the value amount and including only information that does not identify the specific user.

* * * * *